Nov. 19, 1940.   D. G. TAYLOR   2,222,159
COOLING SYSTEM
Filed June 8, 1935   3 Sheets-Sheet 3

Fig. 3

Inventor
Daniel G. Taylor
By George H Fisher
Attorney

Patented Nov. 19, 1940

2,222,159

UNITED STATES PATENT OFFICE 2,222,159

COOLING SYSTEM

Daniel G. Taylor, Minneapolis, Minn., assignor to Minneapolis-Honeywell Regulator Company, Minneapolis, Minn., a corporation of Delaware Application June 8, 1935, Serial No. 25,635

20 Claims. (Cl. 236—91)

This invention relates to cooling systems in general and more particularly to cooling systems for buildings.

The control systems of this invention are for controlling a cooling apparatus directly in conformity with outdoor atmospheric conditions to the end that the proper temperature level may be maintained within the building even though the heat gain to the building may be varied by solar radiation or wind.

The present invention also has the advantage of placement of the thermal control means at a position where it cannot be conveniently tampered with by the occupants of the building to be cooled. Where thermostats are located in any room to be cooled, the tenant may open the window of that room and thereby raise the temperature of the room sufficiently to start the cooling plant and thereby cool the other rooms of the building when such cooling is not needed. This last contingency occurs where a single cooling plant serves a number of rooms and where the thermostat in one of the rooms is adapted to control the cooling plant.

It is therefore an object of this invention to provide a cooling system for a building that responds directly to outdoor atmospheric conditions to maintain given temperatures within the building regardless of the effect of solar radiation or wind.

It is another object of this invention to provide a cooling system for a building wherein the cooling system is under the control of a single control unit so located that it cannot be tampered with by the occupants of the building or be affected by local temperature conditions in the building whereby an average temperature may be maintained throughout the building.

It is still another object of this invention to provide a cooling system of the class described wherein the building temperature may be maintained at a constant predetermined value regardless of outdoor atmospheric conditions or wherein the temperature of the building may rise upon an increase in outdoor temperature.

A further object of this invention is to provide means for adjusting a control system for a cooling apparatus to compensate for changes in the cooling load as caused by the congregation of a large number of people within the building whereby the building temperature may be maintained at a desired value whether there be many or few people within the building.

A still further object is to provide a novel control apparatus for accomplishing the above results.

Other objects and advantages will become apparent to those skilled in the art upon reference to the accompanying specification, claims and drawings, in which drawings:

Figure 1:
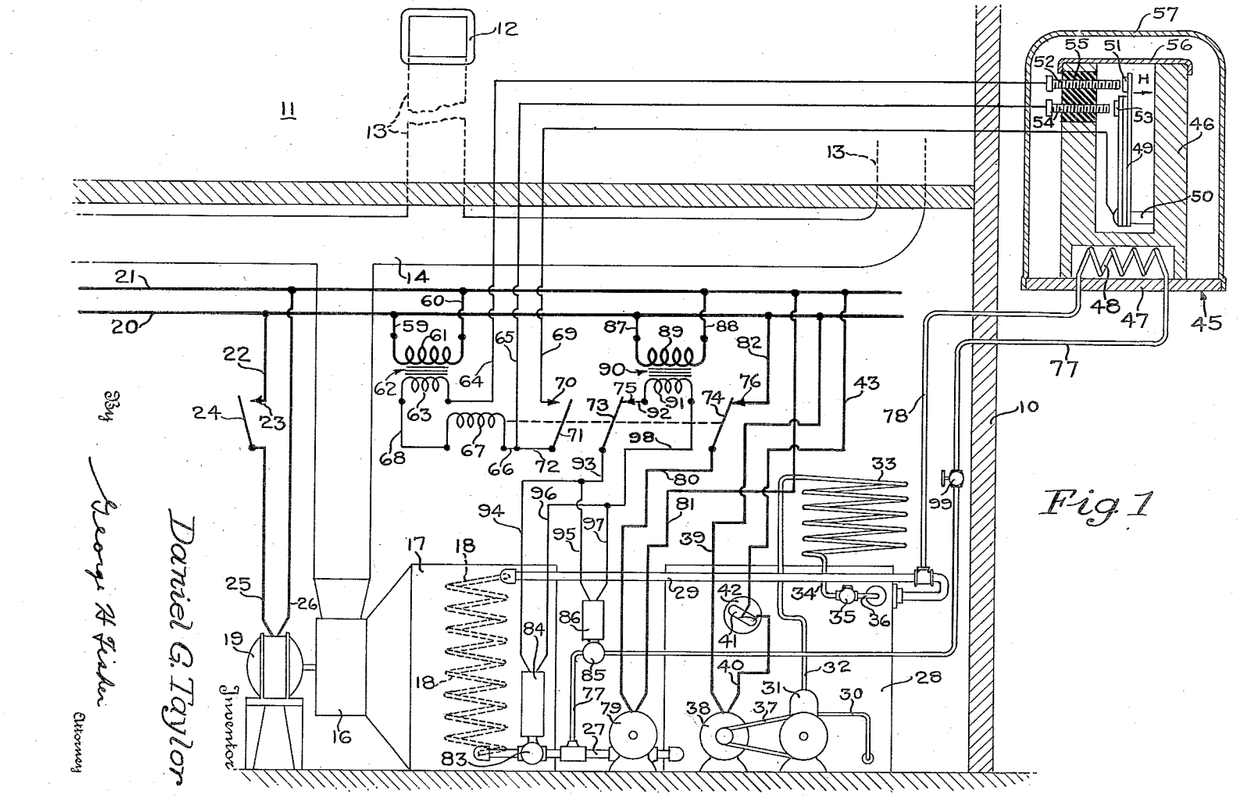
Fig. 1 is a diagrammatic view of one form of my invention.

For purposes of illustration, I have shown in Fig. 1 my cooling system applied to a building, having a side wall 10 and a plurality of spaces to be cooled, one of which is shown at 11. In each of the spaces 11 to be cooled are located one or more grills 12 which connect the spaces to be cooled with an air duct 13. Air flows into the air ducts 13 from a main air duct 14 which is supplied with air by means of a supply duct 15. Air is forced through the various ducts and grills into the spaces to be cooled by means of a fan 16 connected to an air conditioning unit 17. Located in the air conditioning unit 17 is a cooling coil 18 over which the air delivered to the spaces to be cooled is passed. By properly controlling the cooling effect of the cooling coil 18, the temperature of the air delivered to the spaces to be cooled, and consequently the temperature of the spaces may be accurately controlled.

The fan 16 is driven by a conventional electric motor 19 which receives its energy from line wires 20 and 21 leading from some source of power (not shown). A wire 22 connects the line wire 20 with a contact 23. A switch arm 24 cooperates with the contact 23 and is connected by a wire 25 to the electric motor 19. The electric motor 19 is in turn connected by a wire 26 to the other line wire 21. Upon movement of switch arm 24 into engagement with the contact 23, the electric motor 19 is energized to operate the fan 16 to force conditioned air into the spaces to be cooled or conditioned. The switch arm 24 may be operated in any suitable manner but for simplicity it is shown as being manually operated.

The cooling coil 18 in the conditioning unit 17 may be supplied with any type of refrigerant but for purposes of illustration, I have shown one end of the cooling coil 18 connected by a pipe 27 to a brine tank 28 and the other end of the cooling coil 18 also connected by a pipe 29 to the brine tank 28. Located in the brine tank 28 is a cooling coil (not shown) for cooling the brine.

One end of this cooling coil in the brine tank 28 is connected by means of a pipe 30 to the suction side of a compressor 31. A pipe 32 connects the outlet side of the compressor 31 to one end of a condenser coil 33. The other end of the condenser coil 33 is connected by a pipe 34 to an expansion valve 35. The expansion valve 35 is in turn connected to the other end of the cooling coil in the brine tank 28 by means of a pipe 36, thus forming a refrigerating system of usual design for cooling the brine within the tank 28. The refrigerating system contains any usual type of refrigerating fluid. The compressor 31 may be driven through a belt 37 by means of an electric motor 38. The electric motor 38 is connected by a wire 39 to the line wire 20 and by another wire 40 to an electrode of a mercury switch 41. The mercury switch 41 may be operated by a thermostatic device 42 which is known in the art. The other electrode of the mercury switch 41 is connected by a wire 43 to the other line wire 21. The thermostatic device 42 responds to the temperature of the brine within the tank 28 and upon an increase in temperature of the brine above a predetermined value, the mercury switch 41 is tilted in a clockwise direction by the thermostatic device 42 to complete a circuit through its two electrodes to energize the motor 38 to place the compressor 31 in operation to cause cooling of the brine within the tank 28. When the temperature of the brine 28 has decreased to a predetermined value, the thermostatic device 42 tilts the mercury switch 41 in a counter-clockwise direction to break the electric circuit therethrough to stop operation of the electric motor 38 and the compressor 31 to prevent further cooling of the brine within the tank 28. In this manner, the brine within the tank 28 is maintained at a substantially constant temperature so that when the brine from the tank 28 is delivered to the cooling coil 18, a constant definite cooling effect will be imparted to the air passing through the conditioning unit 17.

Located on the outside of the building in any suitable manner so as to respond to outdoor atmospheric conditions, including temperature, solar radiation and wind in the same manner as the building is an outdoor controller 45. The outdoor controller 45 comprises a metallic block 46 suitably mounted on a base 47. A cooling coil 48 is located in close proximity with the block 46 so that when cooling fluid flows through the cooling coil 48, the block 46 is cooled. The block 45 is heated by means of outdoor atmospheric conditions including the effects of temperature, solar radiation and wind. The block 46 is hollowed out to receive a bimetallic element 49 suitably mounted on a post 50. The bimetallic element 49 responds to the temperature of the block 46 and upon an increase in block temperature, the bimetallic element 49 moves in the direction of the arrow. The bimetallic element carries contacts 51 and 53 which are adapted to sequentially engage contacts 52 and 54, respectively, by reason of the fact that the distance between the contacts 51 and 52 is less than the distance between the contacts 53 and 54. The contacts 52 and 54 are adjustably mounted in an insulating block 55 to electrically insulate them from each other. To make sure that the outdoor atmospheric temperatures do not affect the bimetallic element 49 directly, the open end of the block 46 is enclosed by a cover 56. All of the parts comprising the outdoor controller 45 are enclosed by means of a weather-tight casing 57 whereby the parts are not deteriorated by the elements.

Wires 59 and 60 connect a primary 61 of a step-down transformer 62, having a secondary 63, across the line wires 20 and 21, respectively. One end of the secondary 63 is connected by a wire 64 to the adjustable contact 52 of outdoor controller 45. The other adjustable contact 54 is connected by wires 65 and 66 to one end of a relay coil 67. The other end of the relay coil 67 is connected by a wire 68 to the other end of the secondary 63. The bimetallic element 49 of the outdoor controller 45 is connected by means of a wire 69 to a contact 70. A switch arm 71 cooperating with the contact 70 is connected by a wire 72 to the junction of wires 65 and 66. Switch arms 73 and 74 cooperate with contacts 75 and 76. The switch arms 71, 73 and 74 are operated by the relay coil 67 so that upon energization of the relay coil 67, the switch arms 71, 73 and 74 are moved to the left and upon deenergization of the relay coil 67, the switch arms 71, 73 and 74 are moved to the right by means of springs or gravity or other means (not shown).

When the temperature of the metallic block 46 of the outdoor controller 45 decreases to a predetermined value, contact 51 moves into engagement with the contact 52. Upon a further slight decrease in block temperature, contact 53 moves into engagement with the contact 54 to complete a circuit from the secondary 63, through wire 64, contacts 52, 51, 53 and 54, wires 65 and 66, relay coil 67 and wire 68 back to the secondary 63. Completion of this circuit causes energization of relay coil 67 to move the switch arm 71, 73 and 74 to the left. When the switch arm 71 moves into engagement with the contact 70, a holding circuit is completed from the secondary 63, through wire 64, contacts 52 and 51, bimetallic element 49, wire 60, contact 70, switch arm 71, wires 72 and 66, relay coil 67 and wire 68 back to the secondary 63. This holding circuit maintains the relay coil 67 energized until the block temperature 46 has risen sufficiently high to break contact between the contacts 51 and 52 at which time the relay coil 67 is deenergized and the switch arms 71, 73 and 74 move to the right to cause switch arms 73 and 74 to engage contacts 75 and 76, respectively.

The outdoor controller 45 may be cooled by passing any type of cooling fluid through its coil 48. Cooled air which has been passed over the cooling coil 18 or the refrigerant leaving the expansion valve 35 could be used, but for purposes of illustration I have disclosed the use of brine from the tank 28. In this connection, a pipe 77 is connected into the pipe 27 extending between the brine tank 28 and the cooling coil 18. This pipe 77 leads to one end of the cooling coil 48, located in the outdoor controller 45. The other end of the cooling coil 48 is connected by a pipe 78 into the pipe 29 which also connects the cooling coil 18 to the brine tank 28. By reason of these connections, the cooling coils 18 and 48 are, in effect, connected in parallel. Located in the pipe 27 between the brine tank 28 and the pipe 77 is an electrically operated circulating pump 79. This pump 79 is connected by means of a wire 80 to the switch arm 74 and by means of a wire 81 to the line wire 21. The contact 76, cooperating with the switch arm 74, is connected by a wire 82 to the line wire 20. When the relay coil 67 is deenergized upon an increase in block temperature above a given value, the switch arm 74 is moved into engagement with the contact 76 to complete an electric circuit for placing the electrically operated circulating pump 79 in operation to circulate brine through both of the cooling coils 18 and 48. In this manner, the temperature of the air delivered to the spaces in the building and the temperature of the block 46 are decreased. When the temperature of the block 46 decreases below a predetermined value, the relay coil 67 is energized in the manner pointed out heretofore to move the switch arm 74 out of engagement with the contact 76 to break the electric circuit of the circulating pump 79 to stop further circulation of the cooling brine through the cooling coils 18 and 48. In this manner, the circulating pump 79 is placed in and out of operation according to the temperature of the outdoor controller 45 to maintain predetermined temperatures within the building and within the outdoor controller 45.

If it is desired to do away with the circulating pump 79, gravitational flow of cooling fluid to the cooling coils 18 and 48 may be controlled by valves 83 and 85, respectively, these valves being operated by solenoids 84 and 86, respectively.

Wires 87 and 88 connect a primary 89 of a step-down transformer 90, having a secondary 91, across the line wires 20 and 21, respectively. One end of the secondary 91 is connected by a wire 92 to the contact 75. The switch arm 73, cooperating with the contact 75, is connected by wires 93 and 94 to the solenoid 84 of the valve 83. A wire 95 connects the solenoid 86 of the valve 85 to the junction of wires 93 and 94. The solenoid 84 of the valve 83 is connected by wires 96 and 98 to the other end of secondary 91. The solenoid 86 of the valve 85 is connected by a wire 97 to the junction of wires 96 and 98. By reason of these connections, the solenoids 84 and 86, and consequently the valves 83 and 85, are connected in parallel for simultaneous operation. When the temperature of outdoor controller 45 has increased above a predetermined value, the relay coil 67 is deenergized to make contact between the switch arm 83 and the contact 75 to cause simultaneous energization of the solenoids 84 and 86, and therefore simultaneous opening of the valves 83 and 85. Cooling fluid is then permitted to flow from the brine tank 28 to both cooling coils 18 and 48. When the temperature of outdoor controller 45 has decreased below a predetermined value so as to energize the relay coil 67, contact between the switch arm 73 and the contact 75 is broken to deenergize the solenoids 84 and 86 to close the valves 83 and 85 to prevent the further supply of cooling fluid to the cooling coils 18 and 48. Either the valves 83 or 85, or the circulating pump 79 may be used for controlling the supply of cooling fluid to the coils 18 and 48 or the valves 83 and 85 and the circulating pump 79 may both be used for controlling the supply of cooling fluid to the cooling coils 18 and 48, which exemplification is shown in Fig. 1.

Located in the pipe 77, extending between the pipe 28 and the cooling coil 48 of the outdoor controller 45, is a throttling or flow-regulating valve 99 whereby the amount of cooling fluid delivered to the cooling coil 48 may be accurately adjusted.

For purposes of illustrating the mode of operation of the invention as disclosed in Fig. 1, it is assumed that the highest outdoor temperature to be attained is 122° and that when the outdoor temperature is 72°, no cooling of the building is required. In order to maintain the temperature of the building at 72° when the outdoor temperature is substantially 122°, a cooling system for the building must be selected which will maintain this 50° differential in temperature. The amount of cooling fluid delivered to the outdoor controller 45 is adjusted by the valve 99 to maintain the temperature within the outdoor controller at substantially 72° when the outdoor temperature is 122°. In other words, the amount of cooling effect given to the building and the amount of cooling effect given to the outdoor controller 45 is made proportional to the heat gain to the building and the heat gain to the outdoor controller 45 caused by the higher outdoor temperature conditions. The amount of cooling fluid delivered to the outdoor controller 45 is controlled by the throttling valve 99 and by properly adjusting the throttling valve 99, sufficient cooling fluid may be delivered to the outdoor controller when the outdoor temperature is 122° to maintain the outdoor controller temperature at a value slightly above 72° which maintains the contacts 53 and 54 open whereby cooling fluid is continuously supplied to the building and to the outdoor controller. In this manner, the building is maintained at a temperature of substantially 72° at an outdoor temperature of substantially 122°. When the outdoor temperature falls below 122°, the amount of cooling fluid supplied to the outdoor controller 45 is in excess of the amount needed to maintain its temperature slightly above 72° and the block 46 will be cooled below 72° to make contact between the contacts 51, 52, 53 and 54 to energize the relay 67 to shut off the further supply of cooling fluid to the building and to the outdoor controller. After the supply of cooling fluid has been so shut off, the temperature of the controller 45 will rise to a point above 72° which will break contact between the contacts 51, 52, 53 and 54 to deenergize the relay coil 67 to again supply cooling fluid to the building and to the outdoor controller. In this manner, the outdoor controller cycles back and forth to control the cooling system to maintain a substantially constant temperature of 72° within the building in accordance with the outdoor atmospheric conditions. From this it follows that the warmer it is outdoors, the longer the relay coil 67 will remain deenergized and the longer cooling fluid will be supplied to the building and the outdoor controller. It follows, also, that as the outdoor temperature decreases, the periods of operation of the cooling system for the building will likewise decrease until an outdoor temperature of 72° is obtained at which temperature the cycles of operation of the cooling system will be entirely prevented.

Due to the fact that the heat gains to the building and to the outdoor controller are proportional to the amount of cooling given to the building and to the outdoor controller and due to the fact that the outdoor controller 45 responds in a like manner to the same atmospheric conditions as the building, including temperature, solar radiation and wind, the building is maintained at a constant temperature of 72° whether there be a bright sun and no wind or a strong wind and no sun.

If it be desired to have the building temperature increase as the outdoor temperature increases which appears to be the modern trend in building cooling systems, so that the building temperature rises above 72°, an amount of 1° for each 3° rise in outdoor temperature, the size of the capacity of the cooling system may be decreased by 33%. In this manner, when the outdoor temperature is 122° so as to place the cooling system in operation 100% of the time, it will give only two-thirds of the cooling effect of the above described system, whereby a temperature of 89° is maintained in the building instead of a temperature of 72° when the outdoor ambient temperature is 122°. Likewise, for lower outdoor temperatures, the cooling effect of the building cooling apparatus is decreased by one-third and therefore for every 3° rise in outdoor temperature above 72°, the building temperature is allowed to rise 1° above 72°.

Another way to accomplish these results with my system but using a full capacity cooling apparatus so that the temperature of the building is permitted to rise 1° with every 3° rise in outdoor temperature is to adjust the throttling valve 99 to supply a different amount of cooling fluid to the outdoor controller. By increasing the flow of cooling fluid to the outdoor controller to supply more cooling fluid to the same, the contacts 51, 52, 53 and 54 will not remain out of contact when the temperature of the outdoor atmosphere rises to 122°. By increasing the amount of flow of cooling fluid to the outdoor controller in an excess of 50%, the outdoor controller will operate only two-thirds of the time when the outdoor temperature is 122°. With a full capacity cooling system for the building which is capable to maintain the temperature of the building at 72° under 100% operation when the outdoor temperature is 122°, two-thirds of the operation of such a cooling system will permit the building temperature to rise one-third of the differential of 50° to a point corresponding to substantially 89°. Therefore, by increasing the flow of cooling fluid to the outdoor controller 45 by 50%, the time of running of the cooling system of the building is decreased by one-third so that the building temperature will rise 1° with every 3° rise in outdoor temperature.

It is well-known that when a large number of people congregate in a building such as a theatre, the temperature of the building is increased by body heat. The congregation of a large number of people therefore increases the cooling load of the building. It is therefore necessary to increase the amount of cooling effect delivered to the building with respect to the amount of cooling delivered to the building when no people or a relatively small number of people are present within the building. By decreasing the amount of cooling fluid delivered to the outdoor controller 45 which causes an increase in the time of operation of the building cooling system forms an easy means for compensating for cooling load changes caused by the congregation of a large number of people within the building. This change of flow of cooling fluid to the outdoor controller and consequently the change of the cooling system for compensating for the extra cooling load is easily obtained by adjusting the throttle valve 99.

From the above, it is seen that by adjusting the valve 99 the cooling effect of the cooling system of the building may be adjusted so that a constant temperature within the building may be maintained regardless of outdoor atmospheric conditions or a temperature within the building which rises as the outdoor temperature rises may be obtained or the cooling system may be corrected to maintain given temperatures within the building whether they be constant or increasing with outdoor temperatures even though the building should become largely occupied.

Figure 2:
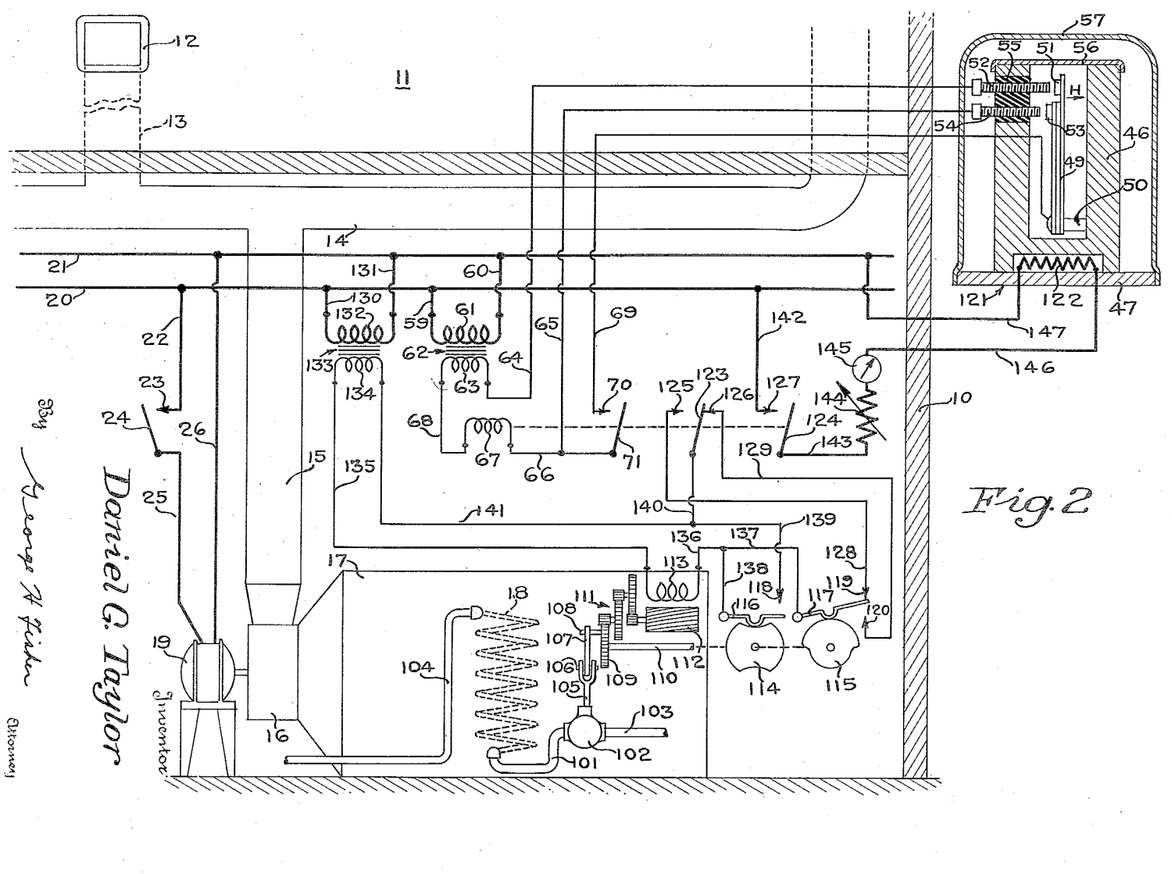
Fig. 2 is a diagrammatic view of another form of my invention.

A modified cooling system is shown in Fig. 2 to be applied to a building having a side wall 10 and a plurality of spaces to be cooled 11. Cooled or conditioned air is delivered to the spaces 11 in this modification as in the previous modification through grills 12 and ducts 13, 14 and 15 by means of a fan 16. The fan 16 draws air through a conditioning unit 17, equipped with a coil 18 as in the previous modification. The fan is driven by an electric motor 19 which receives its power from line wires 20 and 21 and the fan motor 19 is stopped and started by means of the manually operated switch 24 as in the previous modification.

In this modification, cooling fluid is supplied to the cooling coil 18 through a pipe 101 which receives its supply of cooling fluid from a source of cooling fluid (not shown) through a pipe 103. The source of cooling fluid may be the usual city water system, an artesian well or any other means. The cooling fluid after it has passed through the cooling coil 18 is lead away to a place of disposal by means of a pipe 104. The supply of cooling fluid to the coil 18 is controlled by a valve 102 so that when the valve 102 is opened, cooling fluid is allowed to flow through the cooling coil 18 to cool the air passed to the spaces to be cooled 11. The valve 102 is operated by a valve stem 105 to which is connected one end of a pitman 107 by means of a pin 106. The other end of the pitman 107 is connected to a crank pin 108 mounted on a gear 109. The gear 109 is mounted on a shaft 110 for rotation therewith and the gear 109 is driven through a reduction gear train 111 by a rotor 112 upon energization of a field 113. The shaft 110 which carries the gear 109 also carries cams 114 and 115 for rotation therewith. The cams 114 and 115 operate contact arms 116 and 117, respectively. When the high dwells of the cam 114 engage the contact arm 116, the contact arm 116 is moved into engagement with a contact 118. When the high dwell of the cam 115 engages the contact arm 117, the contact arm 117 is moved into engagement with a contact 119 and when the low dwell becomes operative, the contact arm 117 moves into engagement with a contact 120.

Located outside of the building in any suitable manner so as to respond to atmospheric conditions, including temperature, solar radiation and wind velocity in the same manner as the building, is an outdoor controller 121 which is identical to that disclosed in the previous modification with the exception that a heater resistance 122 is used in place of the cooling coil 48 of the previous modification. The heater 122 raises the temperature of the block 46 above the surrounding ambient outdoor temperature and the block 46 is cooled by this surrounding outdoor ambient temperature as varied by solar radiation and wind.

The same transformer 62 and the same relay coil 67 are utilized in operating switch arms 71, 123 and 124 as in the previous modification. The wiring connections between the outdoor controller 121 and the relay coil 67 are identical with those disclosed above. The relay coil 67 controls the operation of switch arms 71, 123 and 124 and upon energization of relay coil 67, the switch arms 71, 123 and 124 are moved to the left into engagement with contacts 70, 125 and 127, respectively. Upon deenergization of the relay coil 67, the switch arms 71, 123 and 124 are moved to the right out of engagement with their respective contacts and the switch arm 123 is moved into engagement with a contact 126. From this, it is seen that when the temperature of the block 46 of the outdoor controller 121 is above a predetermined value, the relay coil 67 is deenergized and the switch arms 71, 123 and 124 are moved to the right and that when the temperature of the block 46 is below a predetermined value, the relay coil 67 is energized and the switch arms 71, 123 and 124 are moved to the left.

The contact 125 is connected by a wire 128 to the contact 119 of the valve motor and the contact 126 is connected by a wire 129 to the contact 120. Wires 130 and 131 connect a primary 132 of a step-down transformer 133, having a secondary 134, across the line wires 20 and 21. One end of the secondary 134 is connected by a wire 135 to one end of field 113. The other end of field 113 is connected by wires 136 and 137 to the contact arm 117. The contact arm 116 is connected by a wire 138 to the junction of wires 136 and 137. The contact 118 of the valve motor is connected by means of wires 139 and 140 to the switch arm 123. The other end of secondary 134 is connected by a wire 141 to the junction of wires 139 and 140.

When the temperature of the block 46 falls below the predetermined value, the relay coil 67 is energized to move the switch arm 123 to the left into engagement with the contact 125 to complete a circuit from the secondary 134, through wires 141, 140, switch arm 123, contact 125, wire 128, contact 119, contact arm 117, wires 137 and 136, field 113 and wire 135 back to the secondary 134. Completion of this circuit causes energization of the field 113 to rotate the rotor 112 and cause closing movement of the valve 102. When the valve 102 has started to close, the cam 114 moves the contact arm 116 into engagement with the contact 118 to complete a maintaining circuit from the secondary 134, through wires 141 and 139, contact 118, contact arm 116, wires 138 and 136, field 113 and wire 135 back to the secondary 134. This maintaining circuit insures complete closing movement of the valve 102. When the valve 102 is completely closed, contact between the contact arm 116 and the contact 118 is broken to prevent further operation of the valve and the contact arm 117 is moved into engagement with the contact 120 to position the valve motor for valve opening operation. When the temperature of the block 46 of outdoor controller 121 rises above the predetermined value, the relay coil 67 is deenergized to move the switch arm 123 into engagement with the contact 126 to complete a circuit from the secondary 134 through wires 141 and 140, switch arm 123, contact 126, wire 129, contact 120, contact arm 117, wires 137 and 136, field 113 and wire 135 back to the secondary 134. Completion of this circuit causes energization of the field 113 to move the valve 102 to an open position. Complete opening movement of the valve 102 is insured by movement of contact arm 116 into engagement with the contact 118 which completes the above referred to maintaining circuit. From the above, it is seen that when the temperature of the block 46 is above a predetermined value, the valve 102 is moved to an open position to supply cooling fluid to the cooling coil 18 and when the temperature of block 46 is below the predetermined value, the valve 102 is moved to a closed position.

The contact 127 is connected by a wire 142 to the line wire 20. The switch arm 124 which cooperates with the contact 127 is connected by a wire 143 to a variable resistance 144 which is in turn connected to an ammeter 145. The ammeter 145 is connected by a wire 146 to one end of the heater 122 of outdoor controller 121. The other end of the heater 122 is connected by a wire 147 to the other line wire 21. When the temperature of block 46 falls below the predetermined value, the relay coil 67 is energized to move the switch arm 124 into engagement with the contact 127 to energize the heater 122 to cause heating of the block 46. When the temperature of block 46 rises above the predetermined value, relay coil 67 is deenergized to break contact between the switch arm 124 and the contact 127 to prevent the further supply of heat to the outdoor controller 121. In this manner, the outdoor controller 121 is maintained at a substantially constant temperature. The variable resistance 144 and the ammeter 145 provide a means for adjusting and visually indicating the amount of heat supplied to the outdoor controller 121.

In describing the operation of this modification, it is assumed that the maximum outdoor temperature that may exist is 122° and that the cooling system for the building is of such capacity as will maintain the temperature of the building at 72° when the outdoor temperature is 122° or, in other words, maintain a differential in temperature between the building and the outdoor ambient temperature of 50°. When the outdoor temperature is 72°, the variable resistance 144 is so adjusted as to deliver so much heat to the outdoor controller 121 that the temperature of block 46 will remain at substantially 122°. The contacts 51, 52, 53 and 54 are so adjusted that they will just be maintained in engagement when the block temperature is 122° and, therefore, the relay coil 67 will remain energized at an outdoor ambient temperature of 72°. Under such conditions, the switch arm 123 will remain in engagement with the contact 125 to maintain the valve 102 closed allowing no cooling fluid to be supplied to the coil 18. By reason of this adjustment, when the outdoor temperature is 72°, the building is not cooled and the building temperature remains at the ambient temperature of 72°. When the outdoor temperature rises above 72°, the block temperature tends to rise the same amount and since the amount of heat delivered to the block 46 is constant, the temperature of the block 46 rises above 122° which causes deenergization of the relay coil 67 and consequent opening of the valve 102 to supply cooling fluid to the cooling coil 18. The building is thereby cooled by this operation. Also, when the relay coil 67 is deenergized, the supply of heat to the outdoor controller is stopped, and the outdoor controller 121 is cooled by the surrounding outdoor atmospheric conditions. The time which the block 46 remains above 122° and consequently the time which the relay coil 67 remains deenergized depends directly upon the outdoor atmospheric conditions. With relatively low outdoor ambient temperatures, the relay coil 67 is deenergized and the valve 102 is opened a relatively short time and with relatively high ambient temperatures, the relay coil 67 is deenergized and the valve 102 is opened a relatively long time. If the outdoor ambient temperature should rise to a value slightly higher than 122°, the block 46 will assume this temperature and the controller contacts will remain open to maintain the relay coil deenergized 100% of the time. This causes valve 102 to remain open 100% of the time and maintain the building temperature at 72°. These variable periods of valve opening vary from zero at 72° to 100% at 122° of outdoor ambient temperature to maintain a constant temperature within the building of 72° at all times.

Since the outdoor controller 121 responds similarly to the same atmospheric conditions as the building, including outdoor temperature and solar radiation and since the building temperature is controlled by the oudoor controller, a substantially constant average temperature may be maintained within the building regardless of the effects of a sun-shiny or dark day.

In order to control the temperature of the building in this modification so that the temperature of the building may rise as the outdoor temperature rises in a ratio of 1° to 3°, the capacity of the building cooling system may be decreased by one-third as in the previous modification. Another way of controlling the temperature within the building so that the building temperature may rise 1° above 72° with every 3° rise in temperature of outdoor temperature above 72°, the amount of heat delivered to the outdoor controller and the contact setting of the outdoor controller may be increased by 50%. To get these results, the contact setting of the outdoor controller is raised 50% of the difference between the present setting and the base temperature or 25°. The contact setting is, therefore, changed from 122° to 147°. The variable resistance 144 is varied to increase the amount of heat to the outdoor controller 121 by 50% so that sufficient heat is supplied to maintain the contacts 51, 52, 53 and 54 just made to maintain the relay coil 67 energized when the outdoor ambient temperature is 72°. By reason of this new setting, when the outdoor temperature is 122°, the contacts of the controller 121 make contact one-third of the time and thereby the valve 102 is closed one-third of the time. Therefore, the valve is opened only two-thirds of the time and the building cooling system has only two-thirds of its maximum cooling effect available when the outdoor temperature is 122°. From this, the temperature of the building is allowed to rise from 72° to 89° which is one-third of the differential between the base temperature of 72° and the existing outdoor ambient temperature of 122°. Likewise, when the outdoor temperature decreases below 122°, the off periods of the cooling system are increased by one-third so that the building will not be maintained at 72° but at a temperature above 72° which is one-third the difference between the ambient temperature and the base temperature. Therefore, by changing the contact setting of and the heat in-put to the outdoor controller in the manner above described, the building temperature is allowed to rise 1° above 72° for every 3° rise in outdoor temperature above 72°.

In the cooling system disclosed by this modification, provision is made also for controlling the cooling equipment of a building in accordance with outdoor atmospheric conditions including temperature and solar radiation so that the building may be maintained at a given constant temperature regardless of outdoor atmospheric conditions or may be maintained at a temperature which increases as the outdoor temperature increases. By decreasing the control setting of and the heat in-put to the outdoor controller, the cooling system of this modification may be adjusted to compensate for increased cooling loads caused by the congregation of a large number of people in the building.

Figure 3:
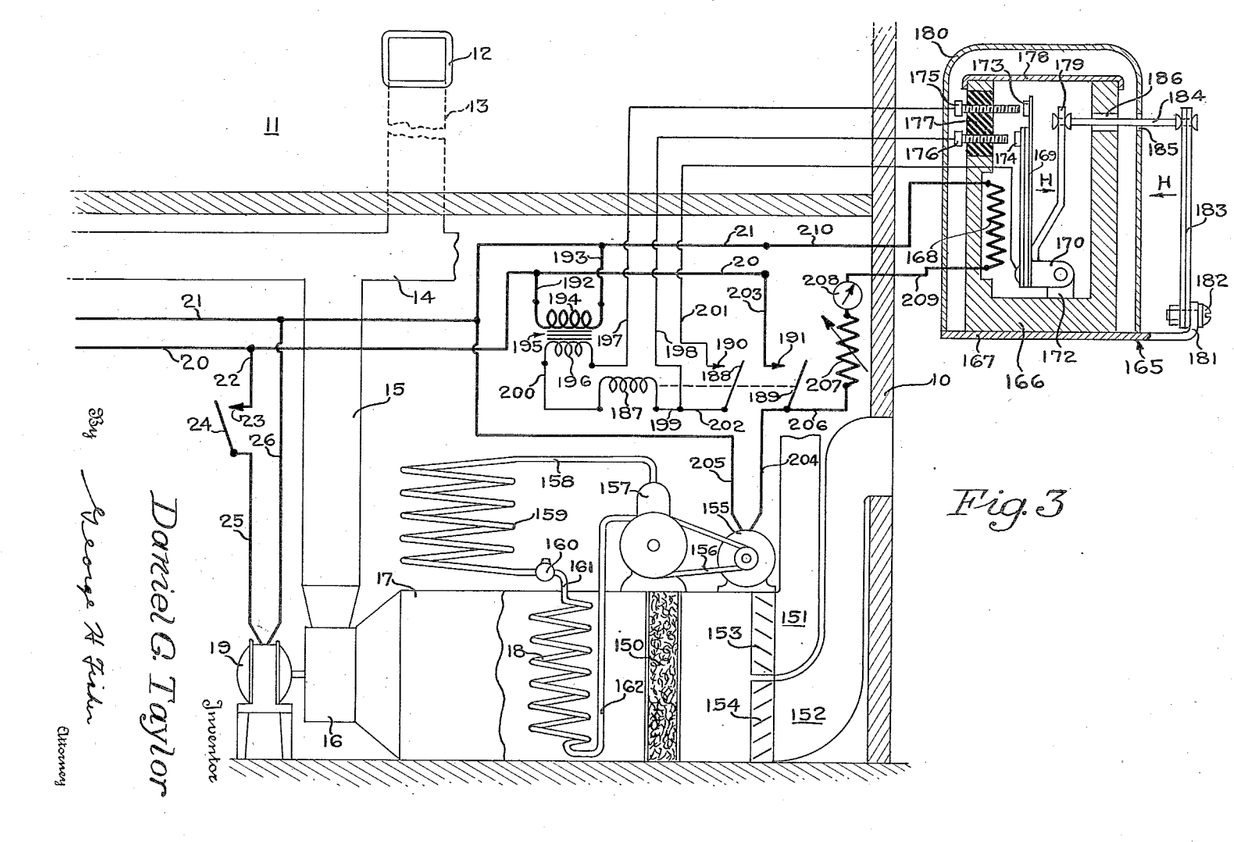
Fig. 3 is a diagrammatic view of still another form of my invention.

Referring now to Fig. 3, I have disclosed the preferred form of my invention and for purposes of illustration, I have shown my control system applied to a building, having an outside wall 10 and a plurality of spaces to be conditioned 11. Conditioned air is delivered to the spaces 11 by means of grills 12 and air ducts 13, 14 and 15. Air is supplied to these ducts by means of a fan 16 which draws air through a conditioner 17. The fan 16 is operated by an electric motor 19 in exactly the same manner as in the previous two modifications, the motor 19 receiving its supply of power from the line wires 20 and 21 under the control of the switch arm 24. Located in the conditioning unit 17 is a cooling coil 18. Also located in the conditioning unit 17 is an air cleaner 150 which may take the form of any known air cleaner. Air is delivered into the conditioning unit 17 through ducts 151 and 152, the duct 151 being used for return air and the duct 152 being used for fresh air. The relative proportion of air delivered by ducts 151 and 152 is controlled by suitably operated dampers 153 and 154 as is known in the art.

Located on the conditioning unit 17 is an electric motor 155 which drives a compressor 157 by means of a belt 156. The outlet side of the compressor 157 is connected by a pipe 158 to one end of a condenser 159. The other end of the condenser 159 is connected to an expansion valve 160 and the expansion valve 160 is in turn connected by a pipe 161 to the other end of cooling coil 18. The other end of cooling coil 18 is connected by a pipe 162 to the suction side of the compressor 157 thereby forming a complete refrigerating unit of the usual design. This refrigerating unit is filled with any suitable type of refrigerant. When the compressor 157 is placed in operation upon energization of motor 155, the cooling coil 18 is cooled and the air delivered to the spaces 11 of the building is likewise cooled.

Located outside of the building so as to respond to atmospheric conditions, including temperature, wind and solar radiation is a modified form of an outdoor controller 165. This outdoor controller 165 comprises a block 166 mounted on a suitable base 167. Located in close proximity to the block 166 is a heater 168. The block temperature is raised by the action of heater 168 and cooled by the action of the outdoor atmosphere including the effects of temperature, solar radiation and wind. The block 166 is hollowed out to receive a bimetallic element 169. The bimetallic element 169 is mounted on a bracket 170, pivotally carried by a support 172. The bimetallic element 169 carries contacts 173 and 174 which are adapted to sequentially engage contacts 175 and 176. The contacts 175 and 176 are insulated from each other and adjustably mounted in an insulating block 177 secured in the block 166. A cover 178 encloses the open end of block 166 so that the bimetallic element 169 will respond directly to the temperature of block 166 and not be affected directly by outdoor atmospheric conditions. The bracket 170 is provided with an upwardly extending adjusting arm 179. A casing 180 encloses the elements of outdoor controller 165 to prevent their deterioration by the elements. The base 167 is provided with an upturned extension 181 upon which is mounted a second bimetallic element 183 by means of a nut and screw arrangement 182. The adjusting arm 179 and the bimetallic element 183 are connected together by a suitable linkage arrangement 184 which extends through openings 185 and 186 in the casing 180 and the block 166, respectively. The bimetallic element 169 responds to the block temperature and the bimetallic element 183 responds to the outdoor ambient temperature directly. Upon an increase in outdoor ambient temperature, the bimetallic element 183 moves to the left in the direction shown by the arrow and upon an increase in the block temperature, the bimetallic element 169 moves to the right in the direction shown by the arrow. The bimetallic element 183 is more effective than the bimetallic element 169 and for purposes of illustration, it is assumed to be twice as effective.

For purposes of illustration, assume that the bimetallic elements 169 and 183 and the contacts 175 and 176 are so arranged and adjusted that with a block temperature of 72° and an outdoor ambient temperature of 72°, the contacts 173, 174, 175 and 176 are just on the point of breaking. Assume that the outdoor ambient temperature rises 5° from 72° to 77°, this forces the bimetallic element 169 to the left and since the bimetallic element 183 is twice as effective as the bimetallic element 169, the block temperature must rise 10° above 72° or to 82° before contact between contacts 173, 175, 174 and 176 is broken. Likewise, for a 10° rise in outdoor ambient temperature affecting the bimetallic element 183, a block temperature 20° above 72° or 92° is required to break the contacts. From this it is seen that the difference between the block temperature and the ambient temperature is equal to the difference between the ambient temperature and the base temperature, the base temperature being 72° in this illustration. Stating it another way, the block temperature rises twice as fast above 72° as the ambient temperature does so that with a maximum outdoor temperature of 122°, the block temperature must be 172° to break contact between the contacts of the outdoor controller 165. By this construction, the block temperature required to break contact between the contacts is adjusted upwardly by an increase in outside ambient temperature.

A relay coil designated at 187 controls the operation of switch arms 188 and 189 so that upon energization of the relay coil 187, the switch arms 188 and 189 are moved into engagement with contacts 190 and 191 and upon deenergization of relay coil 187, the switch arms 188 and 189 are moved out of engagement with their respective contacts by means of springs or gravity or other means (not shown). Wires 192 and 193 connect a primary 194 of a stepdown transformer 195, having a secondary 196, across the line wires 20 and 21, respectively. One end of secondary 196 is connected by a wire 197 to the contact 175 of outdoor controller 165. The contact 176 is connected by wires 198 and 199 to one end of the relay coil 187. The other end of the relay coil 187 is connected by a wire 200 to the other end of secondary 196. The bimetallic element 169 is connected by a wire 201 to the contact 190 and the switch arm 188 cooperating with the contact 190 is connected by a wire 202 to the junction of wires 198 and 199.

When the temperature of the block 166 falls below a predetermined value, as determined by the combined action of the bimetallic elements 169 and 183, contacts 173 and 175 and contacts 174 and 176 make contact to complete a circuit from the secondary 196 through wire 197, contacts 175, 173, 174 and 176, wires 198 and 199, relay coil 187 and wire 200 back to the secondary 196. Completion of this circuit causes energization of relay coil 187 and movement of the switch arms 188 and 189 into engagement with the contacts 190 and 191. When the switch arm 188 engages the contact 190, a maintaining circuit is completed from the secondary 196, through wire 197, contacts 175 and 173, bimetallic element 169, wire 201, contact 190, switch arm 188, wires 202 and 199, relay coil 187, and wire 200 back to the secondary 196 to maintain the relay coil 187 energized until contact between the contacts 173 and 175 is broken by an increase in block temperature as determined by the combined action of the bimetallic elements 169 and 183.

The contact 191 is connected by a wire 203 to the line wire 20, the switch arm 189 cooperating with the contact 191 is connected by a wire 204 to the electric motor 155. The electric motor 155 is in turn connected by a wire 205 to the line wire 21. The switch arm 189 is also connected by a wire 206 to a variable resistance 207 which in turn is connected to an ammeter 208. The ammeter 208 is connected by wire 209 to one end of the heater 168, the other end of heater 168 being connected by a wire 210 to the line wire 21.

When the temperature of the outdoor controller 165 drops below a predetermined value to energize the relay 187 to move the switch arms 188 and 189 into engagement with the contacts 190 and 191, a circuit is completed from the line wire 20, through wire 203, contact 191, switch arm 189, wire 204, motor 155 and wire 205 back to the line wire 21 and a circuit is completed from the line wire 20 through wire 203, contact 191, switch arm 189, wire 206, variable resistance 207, ammeter 208, wire 209, heater 168 and wire 210 back to the line wire 21 to cause operation of the motor 155 and energization of heater 168. Operation of the motor 155 causes cooling of the cooling coil 18 and consequent cooling of the building and energization of heater 168 causes heating of the block 166 of outdoor controller 165. The variable resistance 207 and the ammeter 208 provide a means for adjusting and visually indicating the amount of heat delivered to the block 166.

Assume in this modification as in the previous modifications that the maximum outdoor temperature that may occur is 122° and that the building cooling system is designed to maintain a temperature of 72° in the building when the outdoor temperature is 122° by operating at full capacity. Assume also that the base temperature is 72° so that when the outdoor temperature is below 72°, the building is not to be cooled. When the outdoor temperature is just below 72°, contact between the contacts 173, 174, 175 and 176 is broken by the action of the bimetallic element 183 and the relay coil 187 remains deenergized to prevent operation of the building cooling apparatus and energization of the heater 168.

As pointed out above, with each degree rise in outdoor ambient temperature above the base temperature of 72°, the contact setting of the outdoor controller 165 is raised two degrees above the base setting of 72° by the action of the bimetallic element 183. Therefore, with an outdoor temperature of 77°, the contacts of the outdoor controller are automatically set for 82° and with an outdoor temperature of 82°, the contacts are adjusted to 92°. Likewise, when the outdoor temperature is at its maximum of 122°, the controller contacts are adjusted to a 172° temperature setting. Since it is necessary to operate the building cooling apparatus 100% of the time when the outdoor temperature is 122° to maintain a building temperature of 72°, the contacts 173, 174, 175 and 176 must be maintained in engagement at this maximum outdoor temperature of 122°. Therefore, the variable resistance 207 is adjusted to supply sufficient heat to the outdoor controller 165 to just maintain the temperature of the block 166 at 172° to just maintain the contacts 173, 174, 175 and 176 in engagement. In other words, sufficient heat is supplied to the block 166 to maintain the temperature thereof just 50° above the outside ambient temperature by reason of the substantially straight line relation of the heat loss characteristics of the outdoor controller 165, the same amount of heat applied to the outdoor controller 100% of the time will maintain the 50° differential in temperature between the block temperature and the outdoor ambient temperature even though the outdoor ambient temperature be 122° or 72°.

If the outdoor temperature should drop 10° from 122° to 112°, the differential between the base temperature of 72° and the ambient temperature would be only 40° instead of 50° as before. Therefore, the building cooling apparatus would only have to operate 80% of the time to maintain the building temperature at 72°. A drop of 10° in ambient temperature lowers the temperature setting of the outdoor controller 20° from 172° to 152°. Since the amount of heat delivered to the block 166 is constant and is sufficient to maintain a 50° differential in temperature between the block temperature and the outdoor ambient temperature, 100% operation of the heater would cause a block temperature of 112° plus 50° or 162°. However, the contact settings have been automatically adjusted by the bimetallic element 186 to break contact at substantially 152° to maintain only a 40° differential between the block and the outdoor ambient temperature. It therefore follows that the heater 168 is capable of supplying too much heat to the outdoor controller and need be only energized 80% of the time to maintain this 40° differential between the block temperature and the outdoor ambient temperature. The bimetallic element 169 responding to the block temperature and controlling the contacts 173, 174, 175 and 176 causes energization of the relay coil 187 and consequently the heater 168 only 80% of the time. Since the building cooling apparatus is operated concurrently with the energization of the heater 168, the building apparatus is operated only 80% of the time and therefore the building temperature is maintained at 72°.

In a like manner, if the ambient temperature should drop to 97°, giving a differential of 25° between the base temperature of 72° and the ambient temperature of 97°, the contact setting of the outdoor controller is automatically adjusted to 122°, giving a differential of 25° between the outdoor ambient temperature of 97° and the contact setting. Since the heater 168 is capable of maintaining a 50° differential in temperature by 100% operation, it need operate only 50% of the time to maintain the 25° differential. Consequently, the building cooling means is operated only 50% of the time and the building is maintained at a substantially constant temperature of 72°. Therefore, the building cooling apparatus is operated from 100% of the time at an ambient temperature of 122° to zero percent at an ambient temperature of 72° to maintain a substantially constant temperature of 72° within the building regardless of outdoor ambient temperatures.

In order to control the temperature of the building in this modification so that the temperature of the building may rise as the outdoor temperature rises in a ratio of 1° to 3°, the capacity of the building cooling system may be decreased by one-third as in the previous modifications. Such a mode of operation may also be accomplished in this modification by merely adjusting the variable resistance 207 to vary the supply of heat to the outdoor controller 165. Specifically, the amount of heat delivered to the outdoor controller may be increased by 50% to allow the building temperature to rise 1° above 72° for every 3° rise in ambient temperature above 72°. An increase of 50% in the supply of heat makes it possible to maintain a differential of 75° between the ambient temperature and the block temperature. Therefore, with an ambient temperature of 122°, the block temperature could assume a temperature value of 122° plus 75° or 197° but the contact settings are set for 172° by the bimetallic element 183 and consequently the heater 168 need be energized only two-thirds of the time to maintain a block temperature of 172°. Energization of the heater 168 two-thirds of the time means operation of the building cooling apparatus only two-thirds of the time at 122° ambient temperature. Thus, the cooling apparatus has only two-thirds of its cooling effect and cannot maintain the 50° differential between the ambient temperature of 122° and the base temperature of 72° but only two-thirds of it. The building is therefore maintained at 122° minus two-thirds of 50° or 89° when the outdoor temperature is 122°. In a like manner, the period of operation of the cooling apparatus as determined by the outdoor ambient temperatures are all decreased by one-third so that for each 3° rise in ambient temperature above 72°, the building temperature is allowed to rise 1° above 72°.

Here as in the previous modifications, the outdoor controller 165 responds in a similar manner to the same atmospheric conditions as the building including temperature, wind and solar radiation and predetermined temperatures may therefore be maintained in the building regardless of the effects of a dark, windy day or a still, sunshiny day.

In this modification, provision is also made for adjusting the control system to compensate for changes in the cooling load in the building caused by the congregation of a large number of persons in the building. As pointed out above, the body heat of a large number of persons within the building tends to materially increase the temperature in the same and thereby increases the cooling load on the building cooling apparatus. This compensated effect may be accomplished in this modification by merely adjusting the variable resistance 207. The variable resistance is properly adjusted to decrease the amount of heat delivered to the outdoor controller 165 by the heater 168 which increases the periods of operation of the building cooling apparatus. Another way to accomplish this compensated control is to lower the setting of the contacts without adjusting the variable resistance 207 which would also increase the periods of operation of the cooling apparatus. In these manners more cooling may be supplied to the building to compensate for this extra load.

Although I have disclosed for purposes of illustration definite temperature values, heat values and contact settings, I do not intend to be so limited since various values may be assumed to meet various operating conditions. In disclosing my invention, I have shown and described three specific modifications for purposes of illustration but my invention is to be limited only by the scope of the appended claims and the prior art.

I claim as my invention:

1. In a system of the class described, temperature changing means for an enclosure, a controller including temperature changing means and thermostatic means, the thermostatic means controlling both temperature changing means, and other thermostatic means for adjusting the first thermostatic means.

2. In a system of the class described, temperature changing means for an enclosure, an outdoor controller affected by the same atmospheric conditions as the enclosure, thermostatic means and temperature changing means in said outdoor controller, the thermostatic means controlling both temperature changing means, and means responsive to outdoor temperatures for adjusting the thermostatic means.

3. A structure exposed to outdoor atmospheric conditions, temperature changing means for the structure, an enclosure exposed to the same outdoor atmospheric conditions, temperature changing means for the enclosure, and means responsive to the temperature of the enclosure and outdoor temperatures for controlling both temperature changing means to maintain temperatures in the enclosure that vary with changes in outdoor temperature and to maintain a substantially constant temperature in the structure.

4. A structure exposed to outdoor atmospheric conditions, temperature changing means for the structure, an enclosure exposed to the same outdoor atmospheric conditions, temperature changing means for the enclosure, and means responsive to the temperature of the enclosure and outdoor temperatures for controlling both temperature changing means to maintain temperatures in the enclosure that vary with changes in outdoor temperature and to maintain temperatures in the structure that increase as the outdoor temperature increases.

5. In a temperature control system for an enclosure, comprising, in combination, cooling means for the enclosure, a controller located outside of the enclosure and affected by the same atmospheric conditions as the enclosure, said controller including thermostatic means responsive to the temperature thereof and heating means of sufficient capacity to maintain the temperature of the controller at a desired value, and means controlled by the thermostatic means for alternately operating the enclosure cooling means and the controller heating means to maintain desired temperatures in the enclosure.

6. In a temperature control system for an enclosure, comprising, in combination, cooling means for the enclosure, a controller located outside of the enclosure and affected by the same atmospheric conditions as the enclosure, said controller including thermostatic means responsive to the temperature thereof and heating means having sufficient capacity to maintain the temperature of the controller at a desired value, thermostatic means responsive to outdoor temperature for adjusting the controller thermostatic means to raise the setting thereof as the outdoor temperature increases, and means controlled by the controller thermostatic means for controlling the enclosure cooling means and the controller heating means to maintain desired temperatures in the enclosure.

7. In a system of the class described, temperature changing means for an enclosure, an outdoor controller including temperature changing means and thermostatic means, said thermostatic means controlling said controller temperature changing means in a manner to maintain said controller between predetermined temperature values, and means for energizing said enclosure temperature changing means when said controller temperature changing means is deenergized.

8. In a system of the class described, temperature changing means for an enclosure, an outdoor controller including temperature changing means and thermostatic means, said thermostatic means controlling said controller temperature changing means in a manner to maintain said controller between predetermined temperature values, means for energizing said enclosure temperature changing means when said controller temperature changing means is deenergized, and means for adjusting one of the temperature changing means.

9. In a temperature control system for a building, the combination of, cooling means for the building, a controller located outside of the building and affected by the same atmospheric conditions as the building, said controller including thermostatic means responsive to the temperature thereof and temperature changing means of sufficient capacity to maintain the temperature of the controller at a desired value, means controlled by the thermostatic means for controlling the building cooling means and the controller temperature changing means to maintain desired temperatures in the controller, the cooling effect of the building cooling means and the temperature changing effect of the controller temperature changing means being so proportioned with respect to the effect of outside atmospheric conditions on the building and the outdoor controller that the cooling effect of the building cooling means upon the building is less than the temperature changing effect of the controller temperature changing means upon the outdoor controller whereby the building temperature increases as the outdoor temperature increases.

10. In a temperature control system for a building, the combination of, cooling means for the building, a controller located outside of the building and affected by the same atmospheric conditions as the building, said controller including thermostatic means responsive to the temperature thereof and temperature changing means of sufficient capacity to maintain the temperature of the controller at a desired value, means controlled by the thermostatic means for controlling the building cooling means and the controller temperature changing means to maintain desired temperatures in the controller, and means for relatively adjusting the cooling effect of the building cooling means and the temperature changing effect of the controller temperature changing means with respect to the effects of outside atmospheric conditions on the building and the outdoor controller in a manner to cause the cooling effect of the building cooling means to be less upon the building than the temperature changing effect of the controller temperature changing means is upon the outdoor controller whereby the building temperature increases as the outside temperature increases, the amount of increase in building temperature per unit increase in outside temperature varying with the amount of relative adjustment.

11. In a temperature control system for a building, the combination of, cooling means for the building, a controller located outside of the building and affected by the same atmospheric conditions as the building, said controller including thermostatic means responsive to the temperature thereof and temperature changing means of sufficient capacity to maintain the temperature of the controller at a desired value, means controlled by the thermostatic means for controlling the building cooling means and the controller temperature changing means to maintain desired temperatures in the controller, and means for adjusting the temperature changing effect of the controller temperature changing means with respect to the cooling effect of the building cooling means and the effects of outside atmospheric conditions on the controller and building in a manner cause the temperature changing effect of the controller temperature changing means upon the outdoor controller to be greater than the cooling effect of the building cooling means upon the building whereby the building temperature increases as the outside temperature increases, the amount of increase in building temperature per unit increase in outside temperature varying with the amount of adjustment.

12. In a temperature control system for a building, the combination of, cooling means for the building, a controller located outside of the building and affected by the same atmospheric conditions as the building, said controller including thermostatic means responsive to the temperature thereof and cooling means of sufficient capacity to maintain the temperature of the controller at a desired value, means controlled by the thermostatic means for controlling the building cooling means and the controller cooling means to maintain desired temperatures in the controller, the cooling effect of the building cooling means and the cooling effect of the controller cooling means being so proportioned with respect to the effect of outside atmospheric conditions on the buiding and the outdoor controller that the cooling effect of the building cooling means upon the building is less than the cooling effect of the controller cooling means upon the outdoor controller whereby the building temperature increases as the outdoor temperature increases.

13. In a temperature control system for an enclosure comprising, in combination, cooling means for the enclosure, a controller located outside of the enclosure and affected by the same atmospheric conditions as the enclosure, said controller including thermostatic means responsive to the temperature thereof and heating means of sufficient capacity to maintain the temperature of the controller at a desired value, means controlled by the thermostatic means for controlling the enclosure cooling means and the controller heating means to maintain desired temperatures in the controller, and means for relatively adjusting the cooling effect of the enclosure cooling means upon the enclosure and the heating effect of the controller heating means upon the outdoor controller with respect to the effects of outside atmospheric conditions on the enclosure and the outdoor controller in a manner to cause the enclosure temperature to remain substantially constant regardless of outside temperatures or to cause the enclosure temperature to increase as the outside temperature increases.

14. In a temperature control system for an enclosure, comprising, in combination, cooling means for the enclosure, a controller located outside of the enclosure and affected by the same atmospheric conditions as the enclosure, said controller including thermostatic means responsive to the temperature thereof, and heating means of sufficient capacity to maintain the temperature of the controller at a desired value, means controlled by the thermostatic means for controlling the enclosure cooling means and the controller heating means to maintain desired temperatures in the controller, and means for adjusting the temperature setting of the controller thermostatic means and the heating effect of the controller heating means upon the outdoor controller with respect to the cooling effect of the enclosure cooling means upon the enclosure and the effects of outside atmospheric conditions on the outdoor controller and the enclosure in a manner to cause the enclosure temperature to remain substantially constant regardless of outside temperatures or to cause the enclosure temperature to increase as the outside temperature increases.

15. In a temperature control system for an enclosure, comprising, in combination, cooling means for the enclosure, a controller located outside of the enclosure and affected by the same atmospheric condition as the enclosure, said controller including thermostatic means responsive to the temperature thereof and heating means of sufficient capacity to maintain the temperature of the controller at a desired value, means controlled by the thermostatic means for alternately operating the enclosure cooling means and the controller heating means to maintain desired temperatures in the controller, and means for relatively adjusting the cooling effect of the enclosure cooling means upon the enclosure and the heating effect of the controller heating means upon the outdoor controller with respect to the effects of outside atmospheric conditions on the enclosure and the outdoor controller in a manner to cause the enclosure temperature to remain substantially constant regardless of outside temperatures or to cause the enclosure temperature to increase as the outside temperature increases.

16. In a temperature control system for an enclosure, comprising, in combination, cooling means for the enclosure, a controller located outside of the enclosure and affected by the same atmospheric conditions as the enclosure, said controller including thermostatic means responsive to the temperature thereof and heating means having sufficient capacity to maintain the temperature of the controller at a desired value, thermostatic means responsive to outdoor temperature for adjusting the controller thermostatic means to raise the setting thereof as the outdoor temperature increases, means controlled by the controller thermostatic means for controlling the enclosure cooling means and the controller heating means to maintain desired temperatures in the controller, and means for relatively adjusting the cooling effect of the enclosure cooling means upon the enclosure and the heating effect of the controller heating means upon the outdoor controller with respect to the effects of outside atmospheric conditions on the enclosure and the outdoor controller in a manner to cause the enclosure temperature to remain substantially constant regardless of outside temperatures or to cause the enclosure temperature to increase as the outside temperature increases.

17. In refrigerating apparatus, the combination of means defining a zone to be cooled, an evaporator for cooling the media in said zone, means for circulating refrigerant through said evaporator, and means for intermittently effecting operation of the circulating means for predetermined periods of time and irrespective of temperature conditions within said zone, said means including an element responsive primarily to the temperature of the air exterior of said zone for varying the duration of said periods of time that the circulating means is operated.

18. In refrigerating apparatus, the combination of means defining a zone to be cooled, an evaporator for cooling the media in said zone, means for circulating refrigerant through said evaporator, means for intermittently effecting operation of the circulating means so that it is active and inactive for predetermined periods of time irrespective of temperature conditions within said zone and means responsive primarily to the temperature of the atmosphere exterior of said zone for varying the relation between the period of time that the circulating means is active and the period of time that it is inactive.

19. In refrigerating apparatus, the combination of means defining a zone to be cooled, an evaporator for cooling the media in said zone, means for circulating refrigerant through said evaporator, a motor for driving the circulating means, and means for intermittently effecting energization of the motor for predetermined periods of time and irrespective of temperature conditions within said zone, said means including an element responsive primarily to the temperature of the air exterior of said zone for varying the duration of said periods of time that the motor is energized.

20. In a refrigerating apparatus, the combination of means defining a zone to be cooled, a cooling coil for cooling the media in said zone, means for regulating the circulation of refrigerant through the cooling coil, a motor for driving the same, switch means for controlling energization of the motor, a thermal responsive device disposed in heat transfer relation with the ambient atmosphere exterior of said zone for actuating the switch means, a heater disposed in heat transfer relation with the device, and means for energizing the heater during periods when the motor stops circulation of refrigerant through the cooling coil and for deenergizing the heater during periods when the motor causes circulation of refrigerant through the cooling coil.

DANIEL G. TAYLOR.

CERTIFICATE OF CORRECTION.

Patent No. 2,222,159.  November 19, 1940.

DANIEL G. TAYLOR.

It is hereby certified that error appears in the printed specification of the above numbered patent requiring correction as follows: Page 6, first column, line 69, for the word "control" read --contact--; page 10, first column, line 24, claim 11, before "cause" insert --to--; and that the said Letters Patent should be read with this correction therein that the same may conform to the record of the case in the Patent Office.

Signed and sealed this 1st day of April, A. D. 1941.

(Seal)

Henry Van Arsdale,
Acting Commissioner of Patents.